Sept. 18, 1945.  W. STRAUSS  2,385,311
LOADING DEVICE
Filed July 9, 1942   2 Sheets-Sheet 1
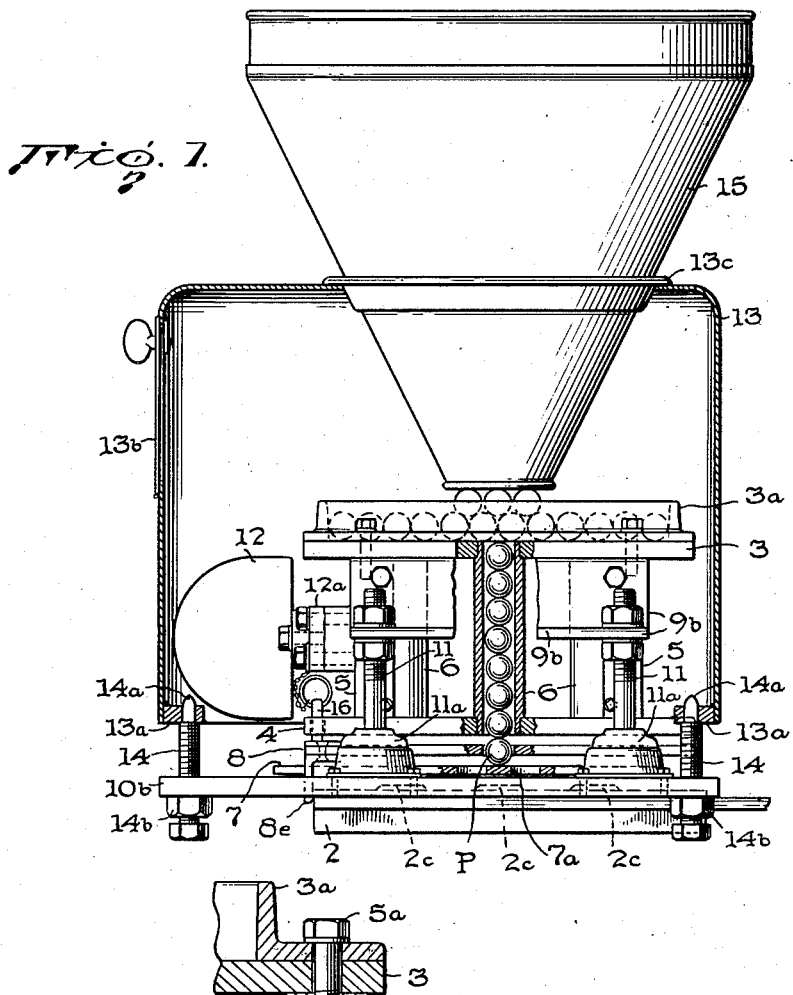
Inventor
WILLIAM STRAUSS
By Ralph B. Stewart
Attorney

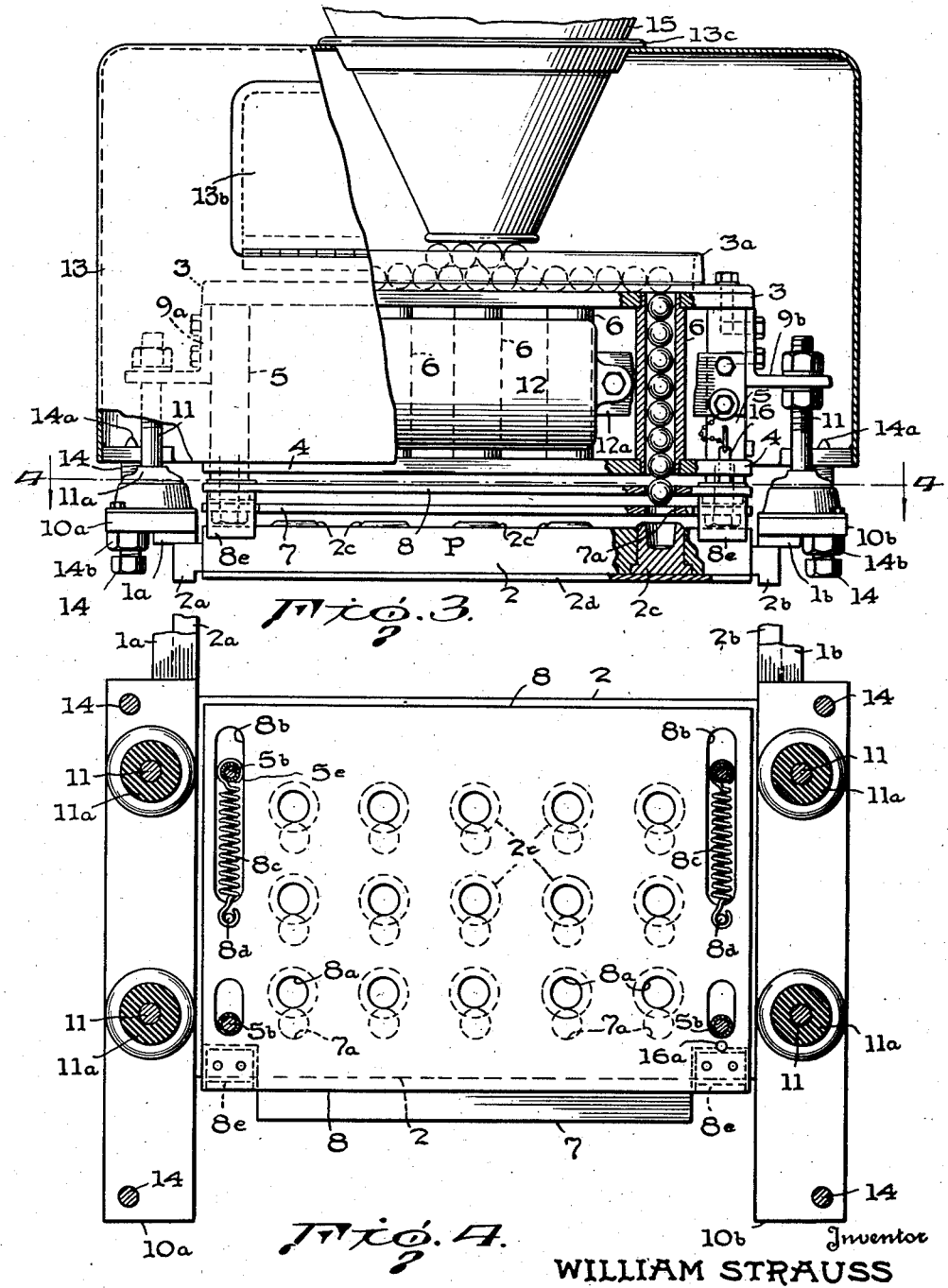

...

UNITED STATES PATENT OFFICE 2,385,311

LOADING DEVICE

William Strauss, Philadelphia, Pa., assignor to F. J. Stokes Machine Company, a corporation of Pennsylvania Application July 9, 1942, Serial No. 450,350

5 Claims. (Cl. 18—30)

This invention relates to a loading device for molding presses, and in particular to a device for loading preforms in multiple cavity presses. The invention is especially useful for loading preforms of a spherical or ball shape, but it may be used for loading preforms of other shapes.

The loading device of the present invention is of the type wherein the preforms are stored in bulk in a hopper or other container, and the only manual attention required by the device is to keep the hopper supplied with preforms.

The loading device is positioned adjacent a molding press in a position such that the die plate containing the mold cavities may be moved from the press to a position beneath the loading device and will trip the loading device to deposit one preform in each mold cavity. Instead of having the die plate move out of the press, a movable loading board may be employed to transfer the proper number of preforms from the loading device to the mold cavities in the die plate positioned in the press.

The main problem in securing successful operation of a loading device of the bulk storage type is in securing proper distribution of the preforms from the bulk storage through individual channels to each separate mold cavity in the die plate, or to each separate cavity in the loading board. The problem mainly is concerned with securing proper flow or movement of the preforms from the bulk storage into the separate channels so that a preform will be fed into each cavity on each operation of the device. The principal difficulty in devices of this type is that the preforms become bridged either in the bulk storage or at the entrance to the individual channels leading to the die cavities. This difficulty is increased where the pressure on the preforms at the entrance to the channels is increased by the weight of the bulk storage. In other words, where the individual channels lead directly out of the bulk storage container, considerable difficulty due to bridging of the preforms is experienced.

An object of the invention is to provide a loading device wherein only a small part of the total weight of the bulk storage is imposed on the preforms which are in a position to enter the individual channels supplying the separate mold cavities.

According to my invention, the preforms are stored in bulk in a hopper which is mounted directly above and discharges into a feeding tray, the outlet opening of the hopper covering only a small portion of the tray. A plurality of storage tubes or chambers lead out of the bottom of the tray and form supply channels for the separate mold cavities. An apertured stop plate is arranged in spaced relation to the lower ends of the storage tubes to prevent preforms from falling out of the tubes by gravity. An apertured transfer plate is positioned between the stop plate and the lower ends of the storage tubes and is mounted to be shifted so as to transfer the lowermost preform in each tube into a position to be discharged through the corresponding aperture in the stop plate and into the proper cavity in the die plate.

A further object is to provide for vibration of the preforms at the entrance to the supply channels to avoid bridging, and at the same time to avoid vibration of the preforms in the bulk storage. For this purpose, the storage tubes and loading tray are constructed as a unit and are mounted to be vibrated by a suitable vibrator. The mounting of the tube assembly includes means for preventing substantial transmission of vibration to the storage hopper or to other portions of the press.

A further object of the invention is to provide for preheating the preforms while they are positioned in the individual storage channels.

Still another object is to provide novel tripping means for releasing a preform from each individual storage channel on each operation of the loading device.

A further object is to devise a loading device in which the storage tube assembly may be easily removed and replaced by another assembly having a different number of tubes or tubes of a different size. The device is readily dismountable for cleaning purposes when it is desired to change over from one color of preform to another.

A further feature of the invention is the provision of means for latching the transfer plate into non-loading position when it is desired to stop the press.

The preferred embodiment of the invention is illustrated in the drawings in which Figure 1 is a side elevational view of the loading device, certain parts being shown in vertical section;

Figure 2 is an enlarged vertical sectional view taken through the central vertical plane of one of the spacer bars;

Figure 3 is a rear elevational view of the loading device, certain parts being shown in section; and Figure 4 is a section view of Figure 3 taken along line 4—4.

Referring to Figures 1 and 3, the loading device is supported upon a pair of horizontal parallel hold-down strips 1a and 1b which are mounted on a molding press (not shown), the press being located to the right of Figure 1. The lower die plate 2 of the press is mounted between and carried by a pair of movable racks 2a and 2b which are positioned beneath hold-down strips 1a and 1b and are mounted in the press to move the die plate 2 from its normal position in the press to a position beneath the loading device as shown in Figure 1. Die plate 2 carries a plurality of die elements 2c, each die element being provided with a die cavity. These die elements are maintained in position by bottom cover plate 2d secured to the lower face of plate 2. In the example shown in the drawings, the die plate 2 carries fifteen die elements arranged in three rows of five elements per row. Other arrangements of the die elements may be employed.

The loading device comprises an upper horizontal header plate 3 and a lower horizontal header plate 4 maintained in spaced relation by four spacer bars 5 positioned between the plates at the four corners thereof. Between header plates 3 and 4 are mounted a plurality of vertical storage tubes 6, the ends of the tubes passing through apertures formed in the plates 3 and 4 as shown in the drawings. The number and position of tubes 6 correspond to the number and position of die elements carried by the die plate 2. The upper header plate 3 is provided with a rectangular frame 3a arranged around its edge and extending upwardly from the upper face thereof, whereby the plate 3 and the frame 3a constitute a horizontal tray-like construction, with the storage tubes 6 leading downwardly out of the bottom thereof. As shown in Figure 2, the frame 3a and the plate 3 may be held in proper position by screws 5a passing through these elements and having threaded engagement with the upper ends of spacer bars 5.

Mounted below bottom header plate 4 and in parallel spaced relation therewith is a stop plate 7. As shown in more detail in Figure 2, this stop plate and the bottom plate 4 may be secured in position by means of screws 5b passing through stop plate 7 and header plate 4 and having threaded engagement with the lower ends of the spacer bars 5. The two plates are maintained in spaced relation by means of a pair of annular spacers 5c and 5d carried by each screw 5b. One of the spacers, for example 5d, is reduced in diameter at one end 5e to provide an annular groove between the two spacers, and a sliding transfer plate 8 is positioned within the annular groove and guided by the reduced portion 5e of the spacer.

As will be seen from Figure 1, stop plate 7 is provided with apertures 7a corresponding in number and arrangement with the die elements 2c carried by die plate 2, but the stop plate is displaced with reference to the tubes 6 so that a solid portion of the stop plate is positioned opposite the lower open end of each storage tube. The transfer plate 8 is likewise provided with apertures 8a in the same manner as stop plate 7 but the transfer plate is normally maintained in a position such that its apertures are in line with the lower ends of storage tube 6, as clearly shown in Figure 1. The lowermost preform P in each storage column is positioned in an aperture in transfer plate 8 and rests against stop plate 7. The remaining preforms in each tube are supported by the lowermost preform as shown in Figure 1. It will be obvious that the spacing between the stop plate 7 and the lower face of plate 4 must be sufficiently large to accommodate the largest preform which can be accommodates by the storage tubes. This spacing is controlled by the width of spacers 5c and 5d.

As shown in Figure 4, transfer plate 8 is provided with elongated apertures at the points where the screws 5b pass through this plate. Two of these apertures 8b are made longer than the other two, and a tension spring 8c is positioned in each long aperture as shown in Figure 4. One end of each spring is hooked around the reduced portion 5e of spacer 5d and the other end is hooked around a pin 8d secured to transfer plate 8 at the other end of the elongated slot. By this arrangement, springs 8c tend to maintain the transfer plate 8 in the position shown in Figure 1, but the plate may be moved to a position where the apertures in the transfer plate come into vertical alignment with the apertures in the stop plate 7. The transfer plate is moved from its normal position by engagement of the front edge of die plate 2 with two vertically extending brackets 8e secured to the two rear corners of the transfer plate and extending downwardly into the path of the die plate. As shown in Figure 4, stop plate 7 is notched at the two rear corners to prevent interference with brackets 8e.

As will be seen from the drawings, the tray and tube construction, together with stop plate 7 and transfer plate 8, is formed as a unit which is removably mounted in the loading device. One convenient arrangement for mounting this unit for adjustment vertically and to permit ready removal is illustrated in the drawings and consists of two angle pieces 9a and 9b secured to opposite sides of the tube assembly and having horizontal flanges extending outwardly over hold-down strips 1a and 1b respectively. A pair of supporting bars 10a and 10b are detachably secured to hold-down strips 1a and 1b, and these bars form supports for four mounting screws 11 which pass through the horizontal flanges of angle pieces 9a and 9b and are secured to the bars 10a and 10b by suitable mountings, each of which has a rubber section 11a forming a support for the lower end of the screws. The tube frame is held in adjustable position by clamping of the horizontal flanges of the brackets 9a and 9b between nuts carried by the supporting screws 11, as will be clear from the drawings. It will be understood that separate tube assemblies will be required for each different arrangement of die elements on the die plate 2. Also, different tube assemblies will be required for different ranges in the size of preforms being used.

In order to prevent bridging or sticking of the preforms in the loading tray or in the mouth of the storage tubes, a vibrator 12 is secured to the tube frame in any suitable manner, as by the supporting bar 12a mounted between two of the corner bars 5. The vibrator 12 may be of any suitable construction for shaking or vibrating the tube assembly generally in a horizontal plane. A suitable vibrator is shown in United States patent to Weyandt No. 2,206,244. The vibrator may be operated continuously or intermittently. In the case of intermittent operation of an electric vibrator, the energizing circuit may be controlled by a suitable switch operated by some movable part of the press, as will be clear to those skilled in the art. The rubber mounting 11a for supporting screws 11 prevents any substantial transmission of the vibrations to supporting bars 10a and 10b and other parts of the press.

The loading device is provided with a hood or cover 13 which, as shown in the drawings, is in the form of an inverted box-like casing positioned over the loading tray and tube assembly. The hood is adjustably supported on four supporting screws 14 having threaded engagement with supporting bars 10a and 10b. The ends of the screws 14 are provided with a reduced portion 14a which extends into apertures formed in four corner-pieces 13a secured in the four corners of the bottom open side of the hood. Screws 14 are held in adjusted position by locking nuts 14b. An inspection door 13b is provided on the front wall of the hood 13 to facilitate inspection of the loading tray and tube assembly.

Preforms are supplied to the loading tray from a storage hopper 15 mounted upon the hood 13. As shown in the drawings, the hopper 15 is supported in a reinforcing ring 13c positioned in an aperture formed in the top wall of the hood 13. Preferably ring 13c is freely seated on hood 13 so that hopper 15 may be easily removed from the hood. This hopper is conical in shape, and the lower small end of the hopper is positioned in spaced relation to the top surface of header plate 3. The correct separation of the lower end of the hopper from the bottom of the loading tray will depend upon the size of the preforms being used. The hopper may be adjusted in a vertical direction with respect to the tray by turning screws 14 to raise or lower the hood 13.

The preforms in hopper 15 tend to flow out of the lower end of the hopper by gravity. If the clearance between the end of the hopper and the bottom of the tray is too small, the preforms will not entirely cover the surface of the tray or will not flow at a rate to keep the storage tubes filled. If the hopper is raised too high above the tray, the preforms will flow out of the hopper too fast and will form more than one layer in the tray and may even spill over the edge of the tray. It is desirable to keep the tray filled with only one layer of preforms; otherwise more than one layer of preforms in the tray is likely to result in bridging of the preforms over the upper ends of the storage tubes. By properly adjusting the height of the hopper, the preforms will flow out of the hopper to keep the tray filled with only one layer. It will be understood that the vibration of the loading tray and tube assembly breaks down the frictional resistance between adjacent preforms and between the preforms and the surface of the loading tray and thus insures proper flow of the preforms to keep the tray filled. It will be noted that the storage hopper is not subject to vibration by the vibrator; this arrangement has two advantages, the first is that it reduces the amount of mass which the vibrator must vibrate, and the second is that the preforms in the hopper are not vibrated and therefore are not worn down and reduced in weight by unnecessary vibration.

Due to the limited area of the outlet opening in the hopper, most of the weight of the preforms contained in the hopper is supported by the hopper walls and is not imposed on the preforms in the tray or in the storage tubes. The preforms which are positioned in the outlet opening of the hopper impose additional weight on the tubes which are immediately under the hopper opening, but only a small part of the total weight of the preforms in storage is imposed on the tubes directly underneath and the pressure at the mouth of the hopper does not vary appreciably with normal variations of preform level in the hopper. Above a certain height in the hopper, all of the preform weight is carried by the hopper walls, and variations in the amount of preforms in the hopper does not substantially change the flow out of the hopper. While the increased pressure at the mouth of the hopper tends to cause bridging of the preforms of this area, the bridging is prevented by the constant flowing of the preforms from the mouth of the hopper outwardly in all directions to maintain the tray completely filled with one layer of preforms. The vibration of the tray and tube assembly also aids in keeping the tray completely filled. The rate of flow of preforms out of the hopper is substantially independent of the amount of preforms in the hopper and is determined by the rate at which preforms are used by the press.

The hopper outlet should be as small as possible consistent with securing the proper flow of preforms out of the hopper to keep the tray filled with only one layer. If the opening is too small, preforms are likely to become bridged in the outlet of the hopper, and they will not flow out fast enough. If the outlet opening is too large, the preforms will flow out too fast and may form more than one layer in the loading tray. Also, a large outlet opening imposes more weight on the preforms in the tray immediately below the outlet and is likely to result in bridging of the preforms over the upper ends of the storage tubes. It will be obvious that to secure best results, the outlet opening of the hopper will vary with different sizes of preforms, although a given outlet opening may be employed for a range of different sizes of preforms.

The storage tubes or chambers in the loading device assure continuous operation of the device even though there should be temporary bridging of the preforms in the hopper or in the loading tray. The length of the storage tubes will depend upon the number of preforms to be maintained in each storage chamber at any given time. As a lower limit, the tubes 6 and plate 4 may be omitted entirely and in this case the holes in plate 3 would constitute the storage chambers or supply channels for positioning at least one preform in each aperture of transfer plate 8.

The operation of the loading device is as follows: It will be understood that a supply of preforms is maintained in the hopper 15 and that the hopper is adjusted for proper vertical spacing above the tray to maintain a single layer of preforms in the tray above the storage tubes. Under this condition, the storage tubes will be filled with preforms, and each aperture in transfer plate 8 will contain a preform. After each molding operation, the die plate 2 (or a suitable transfer loading board) is moved out of the press and into position under the loading device, the die plate engaging brackets 8e and moving transfer plate 8 into position to discharge the preforms through the apertures in stop plate 7 and into the die cavities in the die plate, one preform into each cavity. The die plate may be moved manually or by suitable automatic control means as desired. As shown in the drawings, die plate 2 is just at the point of engaging brackets 8e. As the transfer plate moves the lowermost preform out of each storage column, another preform drops down out of each tube and rests against the upper surface of transfer plate 8. As soon as the die plate is moved back into the press, transfer plate 8 is returned to its normal position by springs 8c, and the lowermost preform in each storage column drops down into the apertures in the transfer plate and rests against a solid portion of stop plate 7, as shown in Figure 1. The loading device is now ready for another operation as described above.

The vibrator 12 may be operated continuously, or it may be operated for a short period during each molding cycle under the control of some moving part of the press.

For the purpose of locking the transfer plate 8 in a position to prevent further feeding of preforms from the loading device, a stop pin 16 is provided to be inserted in an aperture formed in a marginal portion of header plate 4. The lower end of pin 16 when inserted in its aperture normally rests upon a solid portion of the transfer plate 8, but when the plate 8 is shifted to feeding position, the pin drops into an aperture 16a formed in the plate 8, and the pin maintains the transfer plate in shifted position, thus preventing further feeding of preforms from the loading device. As shown in the drawings, stop pin 16 may be attached to the loading device by a suitable flexible connection, such as a small chain, to prevent loss of the pin when not in use.

Preheating of the preforms while they are stored in storage tubes 6 may be accomplished by surrounding the tubes with suitable electric heating elements, or by providing the tube assembly with fluid-tight walls and passing a heated fluid through the interior of the casing and in contact with the outer surface of the storage tubes. It will be understood that the preheating is not carried far enough to cause the preforms to lose their shape.

The entire loading device may be formed of metallic construction if desired, but certain of the parts which are vibrated, for example, plates 3, 4, 7 and 8 and tubes 6 may be formed of hard fibrous material, such as Bakelite, for the purpose of reducing the mass which must be vibrated. By forming storage tube 6 of flexible material, vibrator 12 may be attached to the feeding tray, the vibrations being substantially limited to this tray, and in this way the amount of mass under vibration would be substantially reduced.

The construction illustrated and described herein is the preferred embodiment of the invention, but it will be obvious that various modifications may be made without departing from the principle of the invention. The loading device disclosed herein is flexible in its use and may be readily adjusted for use with different sizes of preforms and different die cavity arrangements. The hood 13 not only provides a vertically adjustable support for the hopper 15, but it also serves as a covering for the loading device to prevent accumulation of dust and dirt.

What I claim is:

1. A loading device for preforms comprising, in combination, a feeding tray having a horizontal bottom, a plurality of feeding channels leading out of the bottom of said tray and being distributed uniformly throughout the area of said bottom, a storage hopper having an outlet opening in the bottom thereof of relatively small dimension compared with the area of said tray, and means for mounting said storage hopper above said tray with the outlet opening thereof positioned substantially centrally of said tray, said mounting means including means for adjusting the height of said outlet opening above the bottom of said tray.

2. A loading device for preforms comprising, in combination, a horizontal feeding tray, a plurality of storage tubes leading out of the bottom of said tray, a horizontal stop plate positioned below said storage tubes and in spaced relation to the lower ends thereof, said stop plate having apertures formed therein corresponding to the arrangement of said storage tubes but in offset relation thereto, a transfer plate positioned between said stop plate and the lower ends of said tubes and having apertures formed therein in line with said tubes, means for mounting said transfer plate for movement in a horizontal plane to a position where the apertures thereof register with the apertures in said stop plate, biasing means for normally holding said transfer plate so the apertures thereof are in line with said tubes, a receiving plate mounted for movement to a position below said stop plate and having a plurality of preform receiving cavities positioned below the apertures in said stop plate, and means controlled by the movement of said receiving plate for shifting said transfer plate to a position where the apertures thereof register with the apertures in said stop plate.

3. A loading device for preforms comprising, in combination, a horizontal feeding tray, a plurality of storage tubes leading out of the bottom of said tray, a storage hopper for preforms having an outlet opening of relatively small area compared with the area of said tray for supplying preforms to said tray, means for mounting said hopper above said tray and for adjustment of the height of said outlet opening above the bottom of said tray, a stationary stop-plate plate mounted below the lower ends of said storage tubes and in spaced relation thereto, said stop plate having apertures formed therein according to the arrangement of said tubes but in offset relation thereto, a shiftable transfer plate positioned between said stop-plate and the lower ends of said tubes and having apertures formed therein according to the arrangement of said tubes, biasing means for normally holding said transfer plate so the apertures thereof are in line with said tubes, a receiving plate mounted for movement to a position below said stop plate, and means controlled by movement of said receiving plate for shifting said transfer plate to a position where the apertures thereof register with the apertures in said stop-plate.

4. A loading device according to claim 3 wherein said tray, storage tubes, stop-plate and transfer plate are constructed as a unit, and including resilient means for mounting said unit for vibratory motion, and means for imparting vibratory motion to said unit.

5. A loading device according to claim 3 and including means for latching said transfer plate in its operated position.

WILLIAM STRAUSS.